United States Patent

Wittkowski

[11] 4,052,882
[45] Oct. 11, 1977

[54] TESTING AND CALIBRATING INSTRUMENT

[75] Inventor: Ulrich Wittkowski, Wolfsburg, Germany

[73] Assignee: Volkswagenwerk Aktiengesellschaft, Wolfsburg, Germany

[21] Appl. No.: 640,852

[22] Filed: Dec. 15, 1975

[30] Foreign Application Priority Data

Dec. 14, 1974 Germany .................... 2459194

[51] Int. Cl.² .................................... G01P 21/00
[52] U.S. Cl. ........................................... 73/1 D
[58] Field of Search ........................... 73/1 D, 12

[56] References Cited

PUBLICATIONS

Conrad et al., ISA Proceedings, vol. 8, 1953, pp. 166–170.

Kaufman, Instruments and Automation, vol. 29, July 1956.

*Primary Examiner*—S. Clement Swisher
*Attorney, Agent, or Firm*—Spencer & Kaye

[57] ABSTRACT

A testing and calibrating instrument for acceleration sensors in which a pendular hammer and a pendular anvil are pivotally mounted on a support. An acceleration sensor which is to be tested and calibrated, as well as a standard acceleration sensor of known characteristics, are attached to the anvil at the level of the impact point at which the hammer strikes the anvil, the hammer and anvil being so dimensioned and positioned with respect to each other that the impact point lies at least approximately at the level of a nodal point of bending oscillations which arise in the anvil when the same is struck by the hammer.

9 Claims, 4 Drawing Figures

Fig. 2
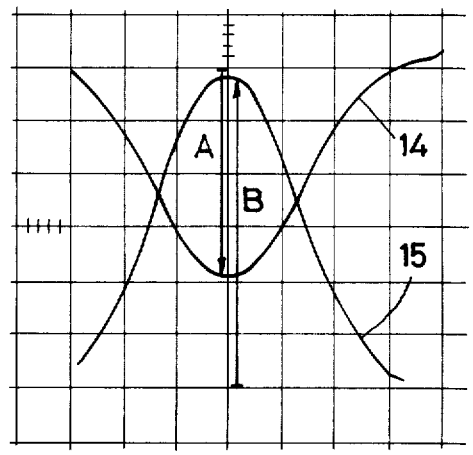
Fig. 3
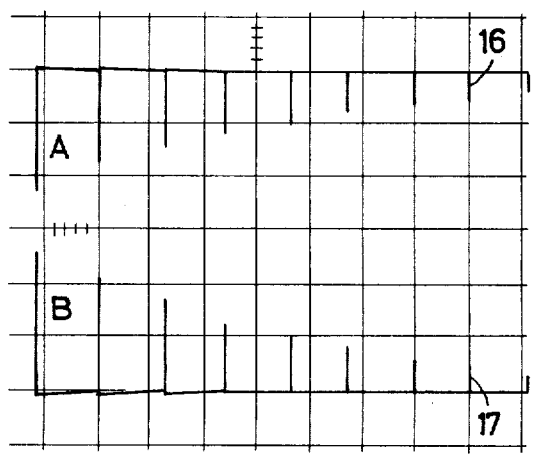
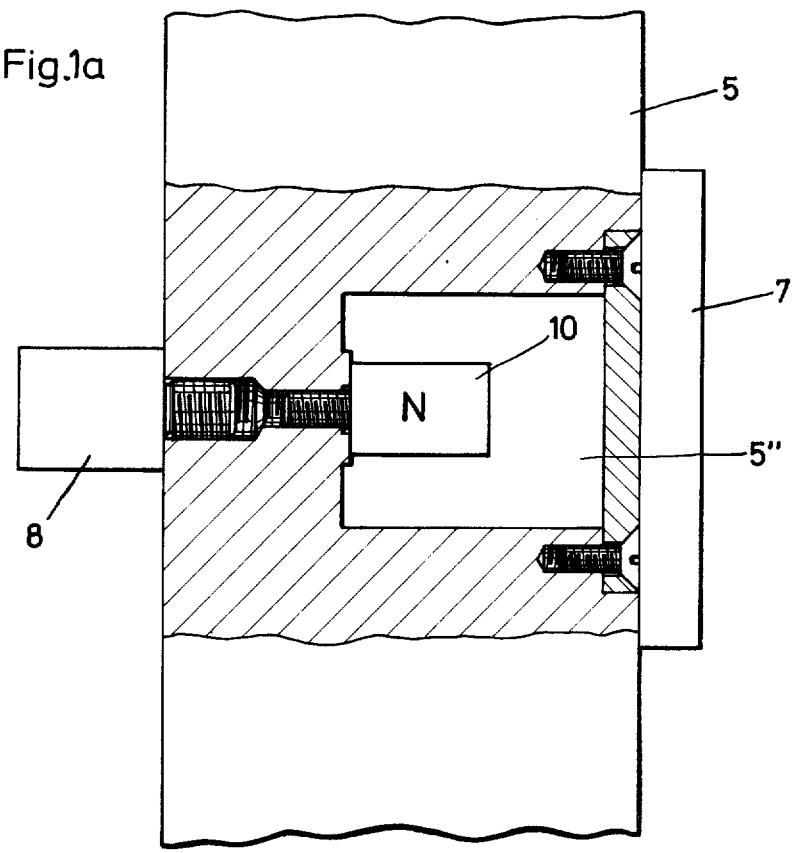
Fig. 1a

TESTING AND CALIBRATING INSTRUMENT

BACKGROUND OF THE INVENTION

The present invention relates to a testing and calibrating instrument for an accelerator sensor. Sensors of this type are used, for example, in accident-prevention research for producing signals which are functions of the acceleration to which various parts of a vehicle are subjected, as well as in occupant safety devices which are actuated when the acceleration of a vehicle exceeds a predetermined given value. Whatever the use of the sensors, it is important that the sensors be properly calibrated, i.e., that it be known at what acceleration value they emit a given signal, and it is, therefore, the primary object of the present invention to provide a simple and rugged instrument by means of which acceleration sensors can be easily and accurately tested and calibrated.

It is another object of the present invention to provide a testing instrument which can be used in such a way that the output of an acceleration sensor being tested can be processed by a computer so to allow the sensor to be calibrated.

It is still a further object of the present invention to provide a testing instrument by means of which an acceleration sensor can, for testing and calibrating purposes, be subjected t a series of consecutive acceleration pulses.

BRIEF DESCRIPTION OF THE PREFERRED EMBODIMENT

With the above objects in view, the present invention resides, basically, in a testing and calibrating instrument comprising support means which have mounted thereon a pendular hammer as well as a pendular anvil, each being mounted for pivotal movement in at least approximately the same plane. The hammer and anvil are dimensioned and positioned with respect to each other such that the hammer strikes the anvil at a given impact point which lies at least approximately at the level of a nodal point of bending oscillations which arise in the anvil when the same is struck by the hammer. Means are provided for attaching an acceleration sensor which is to be tested and calibrated, as well as a standard acceleration sensor of known characteristics, to the anvil at the level of this impact point.

Thanks to the above arrangement, there is provided an instrument by which both a sensor to be tested and a sensor of known characteristics can be subjected to the same acceleration, thus allowing a meaningful comparison to be made between the output readings obtained from the two sensors, while at the same time avoiding the superposition of spurious oscillations which could otherwise adversely affect the signals put out by the sensors.

BRIEF DESCRIPTION OF THE DRAWINGS

FIG. 1a is a fragmentary view, partly in section, showing a detail.

FIG. 2 is an oscillogram obtained from the outputs of the acceleration sensor being tested and the acceleration sensor of known characteristics when these sensors are exposed to a single pulse of acceleration.

FIG. 3 is an oscillogram obtained from the outputs of the mentioned sensors when they are exposed to a series of consecutive acceleration pulses.

DETAILED DESCRIPTION OF THE PREFERRED EMBODIMENT

Figure 1:
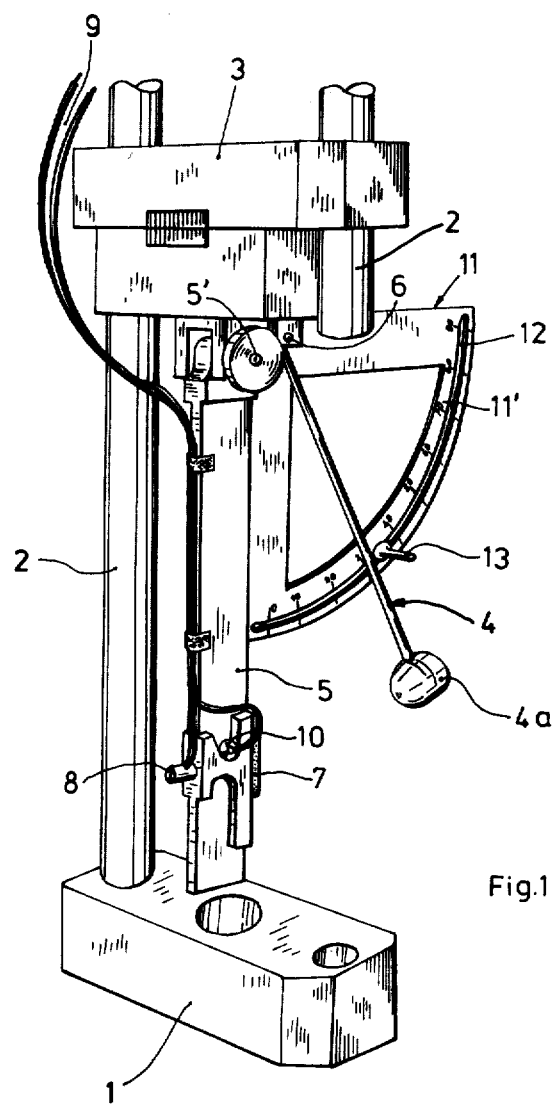
FIG. 1 is a perspective view of a testing and calibrating instrument in accordance with the present invention.

Referring now to the drawings and particularly to FIG. 1, the same shows an acceleration sensor testing and calibrating instrument in accordance with the present invention. The instrument has a base 1 on which are mounted two columns 2 carrying a cross member 3. One of the columns 2 is shown only fragmentarily so as to permit clearer illustration of the parts to be described. The base 1, columns 2 and cross member 3 constitute a support for a pendular hammer 4 having a head 4a and an elongated pendular anvil 5. Both the hammer 4 and the anvil 5 are suspended from the support, hammer 4 being mounted for pivotal movement about an axis 6 and the anvil 5 being mounted for pivotal movement about an axis 5'. As is apparent from FIG. 1, the anvil 5 extends generally downwardly from the point where it is suspended from the support. The hammer 4 is shown as having been swung out of its rest position, i.e., is shown in a position where it is deflected from its vertical rest position and occupies a position in which it forms an angle of 30° with the vertical. The two pivot axes 5' and 6 are parallel, and the arrangement of the parts is such that the hammer 4 and the anvil 5 may pivot in at least approximately the same plane.

When the hammer 4 is released, its head 4a will strike the anvil at an impact point shown generally at 7, which, in the illustrated embodiment is the location of an impact element likewise designated by this reference numeral. The anvil 5 extends lengthwise beyond the impact point 7, with the hammer 4 and anvil 5 being so dimensioned and positioned with respect to each other that upon release of the hammer 4 from the deflected positon shown in FIG. 1, its head 4a strikes the anvil 5 at impact point 7 which lies at least approximately at the level of a nodal point of bending oscillations that arise in the anvil 5. Preferably, the nodal point will be that of the first harmonic of the bending oscillations.

The impact element 7 is, in the illustrated embodiment, in the form of an elastic plate, made, for example, of rubber. The hardness and/or thickness of the plate 7 is selected so as to provide the desired impact time during which the hammer and anvil are in contact with each other and thus the time during which acceleration is imparted to the anvil. If the plate 7 is relatively thick and/or relatively soft, the anvil will be subjected to a relatively long period of acceleration, whereas if the element 7 is in the form of a relatively thin and/or relatively hard rubber layer, the impact time will be shorter and the acceleration relatively high.

The anvil 5 is provided with means for attaching an acceleration sensor 8 to be tested (hereinafter referred to as the "test sensor")as well as a standard or reference acceleration sensor 10 of known characteristics to the anvil 5 at the level of the impact point 7. The sensors are conventional and may be of the variable-resistance, variable-inductance, piezoelectric, piezotransistor or other electromechanical type, and suitable leads 9 are provided for connecting the electrical outputs of these sensors to an oscillograph (not shown).

As shown in FIGS. 1 and 1a, the test sensor 8 is mounted exteriorly of the anvil, on the side opposite the impact point 7, while the standard sensor 10 is located interiorly of the anvil, namely, in a chamber 5". This chamber 5" is provided in the pendular anvil 5 itself, the latter having a flat rectangular cross section, the arrangement being such that the long edges of the cross section extend parallel to the plane of movement of the anvil. Consequently, the anvil is rigid throughout its length and has great mechanical strength and stiffness in the direction in which it is subjected to impacts, while having a low moment of inertia with respect to its pivot axis 5'. The test sensor is thus mounted on an external surface of the anvil 5, so that it can readily be attached and removed without affecting the standard sensor 10. Moreover, the standard sensor is not in any way adversely affected by the test sensor.

The test sensor 8 is shown as being threadedly screwed into the anvil 5, though it will be appreciated that any other sitable mounting arrangement can be used. Moreover, while the drawings show only one test sensor 8 attached to the anvil, it wll be understood that a plurality of such test sensors may be attached, provided they are positoned so as to lie at least approximately at the same level, i.e., the level of nodal point of the vibration oscillations.

Thanks to the fact that the test and standard sensors are located at the level of the impact point 7, and therefore at the level of the mentioned nodal point, the impact of the hammer 4 will superpose no spurious oscillations which could otherwise adversely affect the electrical signals put out by the sensors.

Moreover, it will be appreciated that inasmuch as both the test sensor 8 and the standard sensor 10 are at the same level of the pendular anvil 5 and hence spaced the same distance from the pivot axis 5', they will both follow at least approximately the same orbit about this pivot axis when the anvil is made to pivot under the influence of a hammer strike. This coupled with the fact that both sensors are directionally selective with respect to the direction of the pulse imparted by the hammer blow, means that both will be subjected to substantially the same acceleration. Consequently, both sensors will put out signals which are a measure of the same tangential acceleration, with the centrifugal acceleration being for all practical purposes, negligible. In short, the test and standard sensors are so mounted that they are both subjected to substantially the same acceleration when the anvil 5 is struck by the hammer 4, thus assuring that their respective outputs will be the result of both being subjected to the same acceleration. This, in turn, allows a meaningful comparison to be made between the output readings obtained from the two sensors.

FIG. 1 additionally shows a carrier 11 attached to the support, this carrier being provided with an arcuate scale 11' wich allows the deflection of the hammer 4 to be measured in degrees, so as to make it possible to deflect the hammer to any desired extent and thus provide a way in which to impart the same impact to the anvil during successive experiments. The carrier 11 is provided with a slot 12 within which is mounted an adjustable slide element 13, the latter being positioned so that it can be engaged by the hammer.

As set forth above, the outputs of the test and standard acceleration sensors 8 and 10 are connected to an oscillograph, and FIG. 2 shows the output signals of these sensors when the hammer 4 strikes the anvil 5 one time. For the sake of affording a more readily readable comparison, the sensors 8 and 10 have been connected to the oscillograph in such a way that their signals are of the opposite phase, the output signal 14 being that of the standard sensor 10 and output signal 15 being that of the test sensor 8. The outputs of the two sensors may then be compared by reading the respective amplitudes A and B of the signals 14 and 15. Thus, with both sensors being subjected to the same acceleration and with the output derived from the standard sensor 10 being known, the test sensor 8 may be calibrated.

FIG. 3 shows the output signals produced when the test is carried out by subjecting the anvil to a series of consecutive hammer blows, which can be done by letting the kinetic energy be transferred back and forth between the hammer 4 and the anvil 5. That is to say, when the hammer strikes the anvil for the first time, it comes to rest while transferring practically all of its kinetic energy to the anvil which is thereby made to swing in the same direction. After the anvil has reached its maximum deflection, it will return to its starting point and strike the hammer. The anvil will then come to rest and transfer its kinetic energy back to the hammer which is thereby deflected. This process may be continued with diminished amplitude due to the inevitable frictonal losses, until both the hammer and anvil come to rest. These frictional losses cannot be eliminated completely, even by providing the pivots for the hammer and anvil with ball bearings, although it is possible to select appropriate moments of inertia for the hammer and anvil The time resolution of the oscillogram of FIG. 3 is such that the individual oscillations are shown as lines having the amplitudes A and B, with the upper set of lines 16 representing the output of the standard acceleration sensor 10 and the lower set of lines 17 representing the output of the test acceleration sensor 8. It will be noted that the amplitudes A and B gradually decrease with each series of oscillations, this being the result of the mentioned continual reduction kinetic energy. The signal sequence shown in FIG. 3 can be applied to a computer which, in turn, processes the data so as to allow the test sensor to be calibrated.

It will be understood that the above description of the present invention is susceptible to various modifications, changes and adaptations, and the same are intended to be comprehended within the meaning and range of equivalents of the appended claims.

What is claimed is:

1. A testing and calibrating instrument comprising, in combination:
   a. support means;
   b. a pendular hammer mounted on and suspended from said support means for pivotal movement in a given plane;
   c. an elongated pendular anvil mounted on said support means for pivotal movement in at least approximately the same plane, the length of said anvil extending generally downwardly from the point where it is suspended from said support means, said anvil being rigid throughout its length and said hammer and anvil being dimensioned and positioned with respect to each other such that said hammer strikes said anvil at a given impact point which lies at least approximately at the level of a nodal point of bending oscillations which arise in said anvil when the same is struck by said hammer; and
   d. means for attaching a test acceleration sensor as well as a standard acceleration sensor to said anvil at the level of said impact point.

2. An instrument as defined in claim 1, wherein said attaching means position the standard acceleration sensor interiorly of said anvil and said test acceleration sensor exteriorly of said anvil.

3. An instrument as defined in claim 1, wherein said anvil is provided, at said impact point, with an impact element made of elastic material.

4. An instrument as defined in claim 3, wherein said impact element is in the form of a plate.

5. An instrument as defined in claim 1, further comprising scale means for indicating deflections of said hammer.

6. An instrument as defined in claim 5, wherein said scale means comprise a carrier attached to said support means and a scale on said carrier.

7. An instrument as defined in claim 6, wherein said scale means further comprise an adjustable slide element mounted on said carrier and positioned to be engaged by said hammer.

8. An instrument as defined in claim 1, wherein said anvil has an at least approximately rectangular cross section the long edge of which is parallel to the plane of movement of said anvil.

9. An instrument as defined in claim 1, wherein the nodal point is that of the first harmonic of the bending oscillations.

* * * * *